(12) United States Patent
Tanaka (10) Patent No.: US 10,928,191 B2
(45) Date of Patent: Feb. 23, 2021

(54) MARKER, AND POSTURE ESTIMATION METHOD AND POSITION AND POSTURE ESTIMATION METHOD USING MARKER

(71) Applicant: Nat'l Inst. of Adv. Industrial Sci. and Tech., Tokyo (JP)

(72) Inventor: Hideyuki Tanaka, Nagareyama (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 16/475,558

(22) PCT Filed: Oct. 26, 2017

(86) PCT No.: PCT/JP2017/038713
§ 371 (c)(1),
(2) Date: Jul. 2, 2019

(87) PCT Pub. No.: WO2018/135063
PCT Pub. Date: Jul. 26, 2018

(65) Prior Publication Data
US 2019/0339071 A1    Nov. 7, 2019

(30) Foreign Application Priority Data

Jan. 17, 2017 (JP) .............................. JP2017-006009

(51) Int. Cl.
*G01B 11/02* (2006.01)
*G01B 11/25* (2006.01)
*G06T 7/73* (2017.01)

(52) U.S. Cl.
CPC .............. *G01B 11/254* (2013.01); *G06T 7/74* (2017.01); *G06T 2207/30204* (2013.01)

(58) Field of Classification Search
CPC .. G02B 27/0093; G01B 11/026; G01B 11/26; H04N 13/0468; G01C 15/002;
(Continued)

(56) References Cited

U.S. PATENT DOCUMENTS 6,847,392 B1 * 1/2005 House .................... H04N 13/25
                                                              348/36
6,973,202 B2 * 12/2005 Mostafavi .............. A61B 6/463
                                                              382/103

(Continued)

FOREIGN PATENT DOCUMENTS

CN         1519643 A     8/2004
CN       101116101 A     1/2008

(Continued)

OTHER PUBLICATIONS

Hideyuki Tanaka et al., *A Solution to Pose Ambiguity of Visual Markers Using Moire Patterns*, 2014 IEEE/RSJ International Conference on Intelligent Robots and Systems (IROS 2014), Sep. 14-18, 2017, pp. 3129-3134.

(Continued)

*Primary Examiner* — Hoa Q Pham
(74) *Attorney, Agent, or Firm* — Workman Nydegger (57) ABSTRACT

A marker for achieving more accurate position and posture estimation, and a posture estimation method and a position and posture estimation method using this marker are provided. In order to solve this problem, the present invention provides a marker for estimating the posture of an object, wherein the marker includes standard variable moire patterns VS1 and VS2 for estimating a visual line angle around at least one axis with respect to the object and high-sensitivity variable moire patterns VH1 and VH2 that have a resolution of visual line angle higher than the standard (Continued)

variable moire patterns VS1 and VS2 and that are used to estimate the visual line angle around the axis.

3 Claims, 9 Drawing Sheets

(58) Field of Classification Search
CPC .......... G01C 15/06; G06T 7/004; G06T 7/74; G06T 7/70; G06T 7/60; G06T 7/0042; G06T 7/0044; G06T 7/0046; G06T 7/0051; G06T 7/0057; G06T 7/0081; G01D 5/26
USPC .................. 356/601–623; 348/135; 382/153
See application file for complete search history.

(56) References Cited

U.S. PATENT DOCUMENTS

| | | | | |
|---|---|---|---|---|
| 8,922,644 | B2* | 12/2014 | Larsen | G01B 11/026 348/135 |
| 1,026,242 | A1 | 4/2019 | Tanaka | |
| 10,262,429 | B2* | 4/2019 | Tanaka | G06T 7/74 |
| 2006/0071946 | A1* | 4/2006 | Anabuki | G06K 9/3216 345/633 |
| 2006/0184013 | A1* | 8/2006 | Emanuel | G01S 5/16 600/426 |
| 2011/0017826 | A1 | 1/2011 | Mohan et al. | |
| 2012/0086801 | A1 | 4/2012 | Larsen | |
| 2013/0044290 | A1* | 2/2013 | Kawamura | A61B 3/032 351/201 |
| 2014/0111639 | A1 | 4/2014 | Tanaka et al. | |
| 2016/0239952 | A1 | 8/2016 | Tanaka | |
| 2019/0228541 | A1* | 7/2019 | Tanaka | G06T 7/73 |
| 2020/0003559 | A1* | 1/2020 | Kawakami | G01C 15/06 |
| 2020/0011660 | A1* | 1/2020 | Tanaka | G01C 15/06 |
| 2020/0056884 | A1* | 2/2020 | Saito | G01B 11/00 |
| 2020/0158500 | A1* | 5/2020 | Saito | G01B 11/00 |

FOREIGN PATENT DOCUMENTS

| | | |
|---|---|---|
| CN | 103262520 A | 8/2013 |
| CN | 105074325 A | 11/2015 |
| CN | 105612401 A | 5/2016 |
| JP | 2006-267879 A | 10/2006 |
| JP | 2012-145559 A | 8/2012 |
| JP | 2014-501908 A | 1/2014 |
| JP | 2014-102246 A | 6/2014 |
| WO | 2012/047340 A1 | 4/2012 |
| WO | 2015-045834 A1 | 4/2015 |
| WO | 2016-024555 A1 | 2/2016 |

OTHER PUBLICATIONS

Hideyuki Tanaka et al., *Improving the Accuracy of Visual Markers by Four Dots and Image Interpolation*, 2016 IEEE International Symposium on Robotics and Intelligent Sensors (IRIS 2016), Dec. 17-20, 2016, pp. 6.
International Search Report dated Dec. 5, 2017, issued in PCT Application No. PCT/JP2017/038713, filed Oct. 26, 2017.
International Preliminary Report on Patentability dated Jul. 23, 2019, issued in PCT Application No. PCT/JP2017/038713, filed Oct. 26, 2017.
Office Action dated Aug. 10, 2020 in corresponding European Patent Application No. 201780082133.X.
EESR issued on Jun. 18, 2020 in corresponding European Patent Application No. 17892772.9.
Office Action dated Aug. 10, 2020 in corresponding Chinese Patent Application No. 201780082133.X.

* cited by examiner

MARKER, AND POSTURE ESTIMATION METHOD AND POSITION AND POSTURE ESTIMATION METHOD USING MARKER

TECHNICAL FIELD

The present invention relates to a marker for estimating the posture and position of an object, as well as a posture estimation method and a position and posture estimation method using this marker.

BACKGROUND ART

A planar pattern has been suggested that can provide the measurement of the position and posture of an object in a three-dimensional space, when being imaged by a monocular camera. Such a planar pattern is generally called a planar visual marker.

The planar visual marker as described above has been used in the fields of Augmented Reality (AR) and robotics for example by being adhered to an object. Various planar visual markers have been developed by the applicant of this application (see Patent Publications 1-3 and Non-Patent Publication 1).

CITATION LIST

Patent Literature

Patent Publication 1: Japanese Patent Laid-Open No. 2012-145559
Patent Publication 2: Japanese Patent Laid-Open No. 2014-102246
Patent Publication 3: International Publication No. WO/2015/045834

Non-Patent Publication

Non-Patent Publication 1: H. Tanaka, K. Ogata, and Y. Matsumoto, "Improving the Accuracy of Visual Markers", in Proc. 2016 IEEE Int. Symposium on Robotics and Intelligent Sensors, 2016

SUMMARY OF INVENTION

Technical Problem

However, in the case where the position and posture of an object is estimated by an existing planar visual marker, a disadvantage is caused where an accuracy similar to the high accuracy of the position measurement using the Global Positioning System (GPS) is not obtained.

The present invention has been made in order to eliminate the disadvantage as described above. It is an objective of the invention to provide a marker realizing a more accurate estimation of the position and posture as well as a posture estimation method and a position and posture estimation method using this marker.

Solution to Problem

In order to eliminate the above disadvantage, the present invention provides: a marker for estimating the posture of an object, comprising: a first visual line angle estimation means for estimating a visual line angle around at least one axis with respect to the object; and a second visual line angle estimation means for estimating the visual line angle around the axis, the second visual line angle estimation means has a resolution of visual line angle higher than that of the first visual line angle estimation means.

In order to eliminate the above disadvantage, the present invention provides a posture estimation method using a marker for estimating the posture of an object, comprising: a first step of using the first visual line angle estimation means to preliminarily determine a visual line angle around at least one axis with respect to the object; a second step of using the second visual line angle estimation means having a resolution of visual line angle higher than that of the first visual line angle estimation means to calculate candidate values of the visual line angle around the axis; and a third step of setting, as an estimated value of the visual line angle around the axis, such a value among the candidate values calculated in the second step that is closest to the visual line angle preliminarily determined in the first step.

In order to eliminate the above disadvantage, the present invention provides a position and posture estimation method using a marker by which an optimal solution using both of the position and posture of an object as a variable is obtained to thereby determine the estimated values for the position and the posture. This method includes: a first step of using the first visual line angle estimation means to preliminarily determine a visual line angle around at least one axis; a second step of using the second visual line angle estimation means having a resolution of visual line angle higher than that of the first visual line angle estimation means to calculate candidate values of the visual line angle around the axis; a third step of setting, as an estimated value of the visual line angle around the axis, such a value among the candidate values calculated in the second step that is closest to the visual line angle preliminarily determined in the first step; and a fourth step of using the estimated value of the visual line angle obtained in the third step to calculate an estimated value of the position.

Advantageous Effects of Invention

The present invention can provide a marker realizing a more accurate estimation of the position and posture, as well as a posture estimation method and a position and posture estimation method using this marker.

DESCRIPTION OF EMBODIMENTS

The following section will describe an embodiment of the present invention with reference to the drawings in which the same reference numerals denote the same or similar parts.

First, with reference to FIG. 1 and FIG. 2, the definitions of terms will be described. The following section will exemplarily describe the phenomena at around the Y axis. However, the phenomena at around the arbitrary axis will be also defined.

Figure 1:
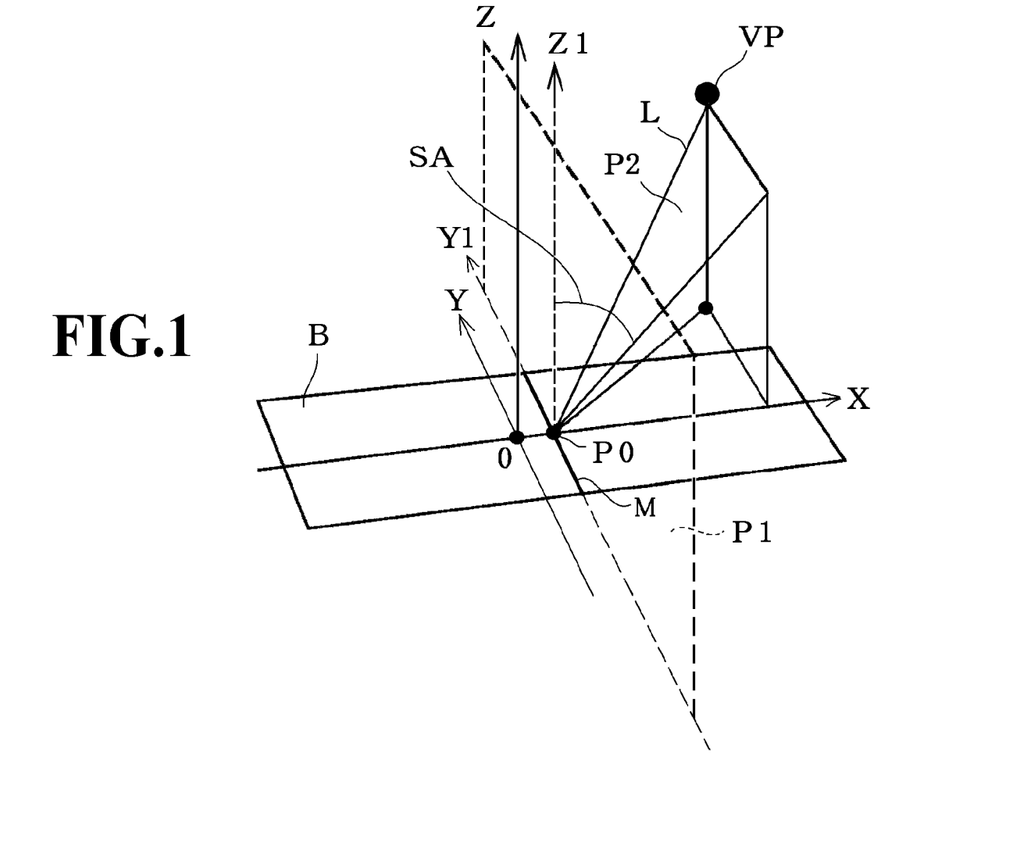
FIG. 1 illustrates the definitions of a visual line and a visual line angle.
Figure 2:
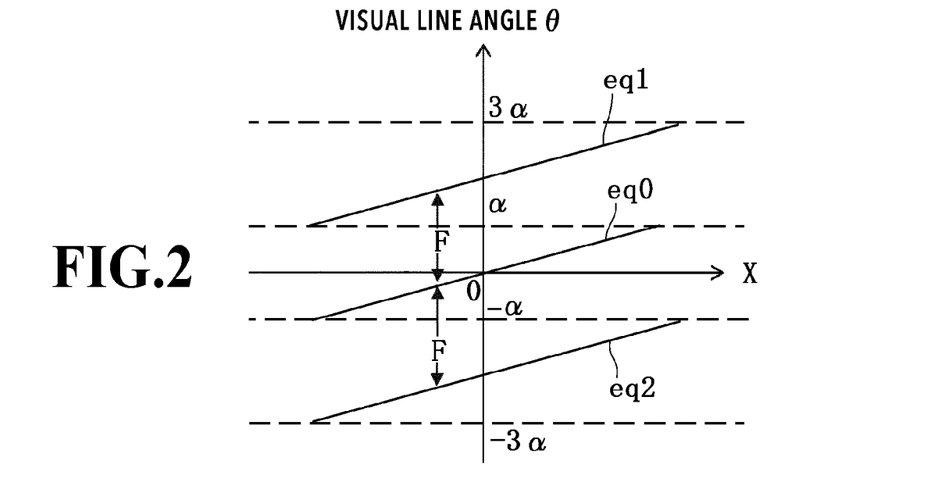
FIG. 2 illustrates the definition of a cycle in a variable moire pattern.

In FIG. 1, it is assumed that a moving mark M (which will be described later) has a center at a look-at point P0. It is assumed that an axis on a plane B formed by a measurement object that is parallel to a Y axis and that passes through the look-at point P0 is a Y1 axis and an axis that is parallel to a Z axis vertical to the plane B and that passes through the look-at point P0 is a Z1 axis.

It is noted that a line L connecting an observation visual point VP and the look-at point P0 shown in FIG. 1 is called a visual line. As shown in FIG. 1, when assuming that a plane including the Z1 axis and the Y1 axis orthogonal to the Z1 axis is called a plane P1 and a plane including the line L and the Y1 axis is a plane P2, an angle SA formed by the plane P1 and the plane P2 is called a visual line angle around the Y axis.

The variable moire pattern means, as disclosed in Patent Publication 1, an interference fringe pattern that changes a pattern (or that is visually recognized as moving) depending on an angle along which the pattern is visually observed. The variable moire pattern has a function to uniquely determine the posture of a marker within a certain range of visual line angles.

In the following description, a variable moire pattern having a visual line angle range of ±25~30 degrees for example within which the observation is possible is called a standard variable moire pattern. A variable moire pattern having a higher sensitivity than that of the above pattern is called a high-sensitivity variable moire pattern.

A line in a variable moire pattern that is visually recognized as moving depending on an observation angle is called a moving mark.

On the other hand, the position on an X axis at which the moving mark is observed corresponds to a visual line angle SA to the look-at point P0 which is a center of the moving mark M shown in FIG. 1. Specifically, when assuming that the rectangular shaped variable moire pattern has a center as the origin 0 and the variable moire pattern has a major axis direction as a X axis and has a minor axis direction as a Y axis, the relation between the position of the moving mark M on the X axis and the visual line angle θ around the Y axis is as shown in FIG. 2. A straight line graph eq0 shows the trajectory of the main moving mark M visually recognized in vicinity of the center when the variable moire pattern is seen from the front side. Straight line graphs eq1 and eq2 show the trajectories of the moving mark that appears, when the moving mark M moves to an end of variable moire pattern, from the other end thereof. A distance F on the visual line angle between the trajectories is called a cycle. Specifically, a cycle means a visual line angle required for a moving mark adjacent to the current moving mark on the variable moire pattern to move to the same position as that of the current moving mark. FIG. 2 shows a case where the cycle is 2α.

Figure 3:
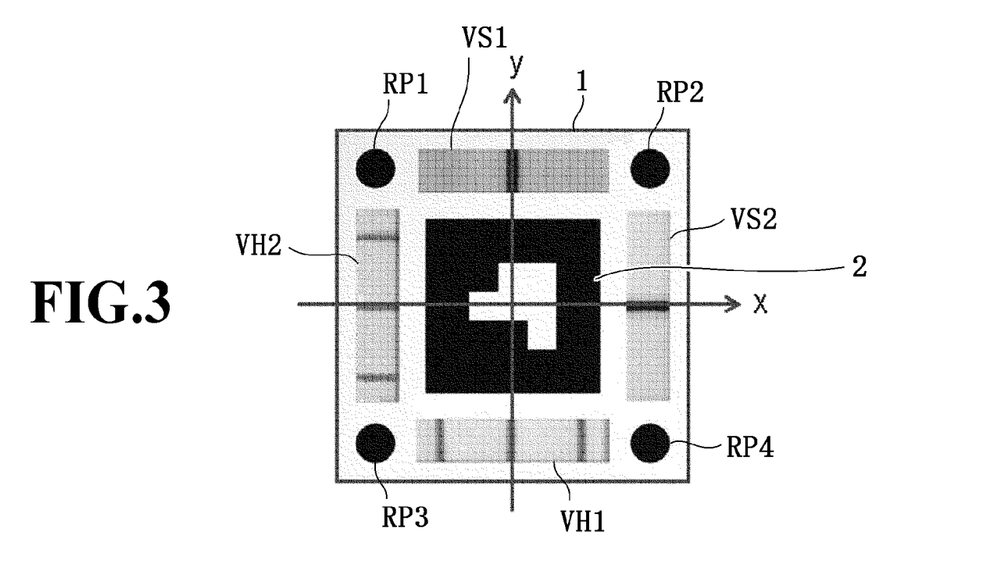
FIG. 3 is a plan view illustrating the configuration of a planar visual marker 1 according to an embodiment of the present invention.

FIG. 3 is a plan view illustrating the configuration of the planar visual marker 1 according to an embodiment of the present invention. As shown in FIG. 3, the planar visual marker 1 includes: a rectangular AR marker 2 including a two-dimensional pattern code, plane rectangular-shaped standard variable moire patterns VS1 and VS2 that are provided on the same plane as that of the AR marker 2 and that are provided to be parallel to two adjacent sides of the AR marker 2, respectively, plane rectangular-shaped high-sensitivity variable moire patterns VH1 and VH2 that are provided at a position opposed to the standard variable moire patterns VS1 and VS2 to sandwich the AR marker 2, and reference points RP1 to RP4 provided at four corners.

Specifically, the standard variable moire patterns VS1 and VS2 have a major axis provided so as to be orthogonal to the y axis and the x axis that are rotation axes, respectively. The high-sensitivity variable moire patterns VH1 and VH2 also have a major axis provided to be orthogonal to the y axis and the x axis that are rotation axes, respectively.

The high-sensitivity variable moire patterns VH1 and VH2 shown in FIG. 3 generally have a sensitivity n times higher than those of the standard variable moire patterns VS1 and VS2 (n is a number larger than one), in this case, the resolution of the visual line angle is (1/n) times. At this time, the movement speed of the moving mark relative to a change of the visual line angle is multiplied n times. Therefore, the high-sensitivity variable moire pattern has a cycle obtained by multiplying the cycle of the standard variable moire pattern by (1/n).

Figure 4A:
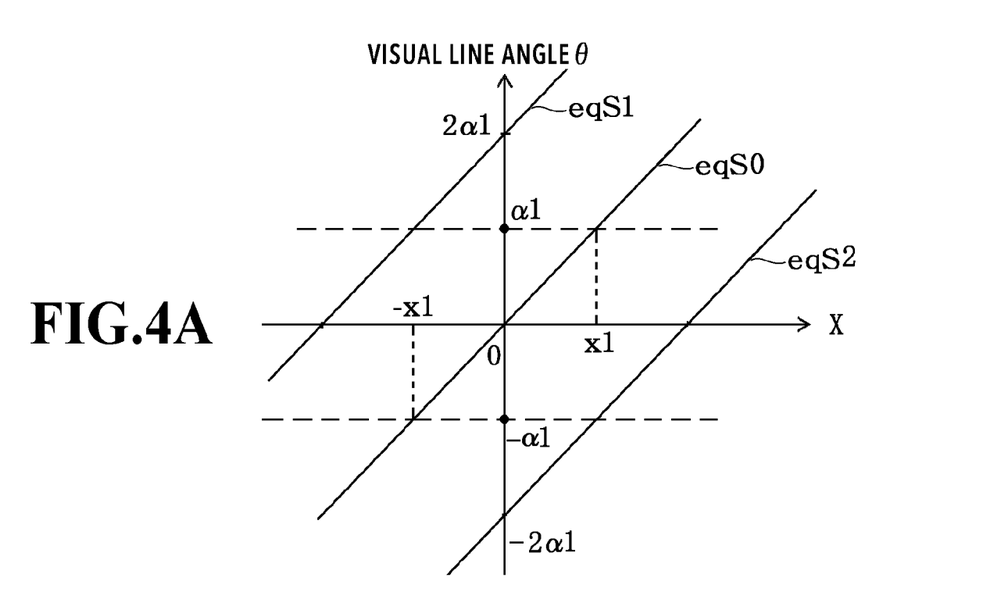
FIG. 4A is a graph illustrating the relation between a moving mark position X and a visual line angle θ in standard variable moire patterns VS1 and VS2 shown in FIG. 3.
Figure 4B:
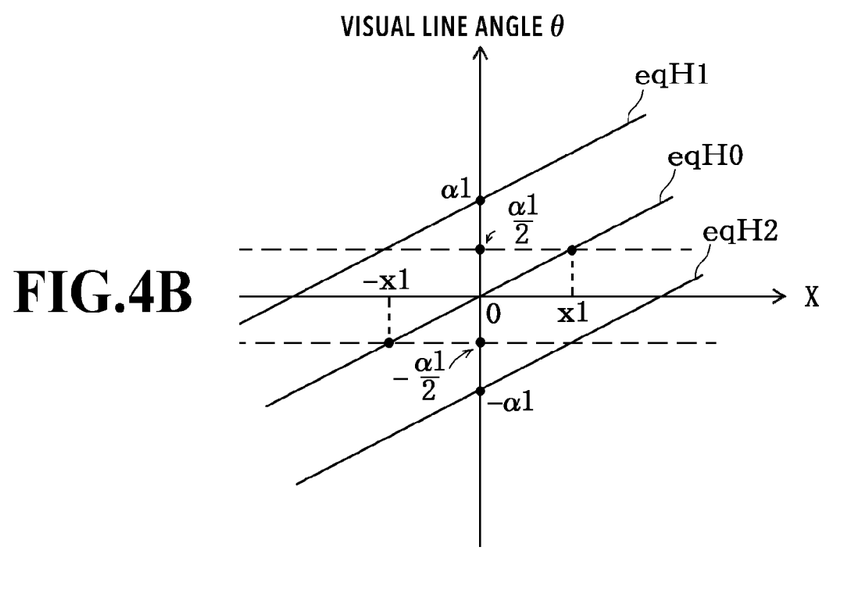
FIG. 4B is a graph illustrating the relation between the moving mark position X and the visual line angle θ in the high-sensitivity variable moire patterns VH1 and VH2 shown in FIG. 3.

When n is 2 in an example, the relation between the moving mark position X and the visual line angle θ in the standard variable moire patterns VS1 and VS2, respectively, is shown in FIG. 4A, and the relation between the moving mark position X and the visual line angle θ in the high-sensitivity variable moire patterns VH1 and VH2 is shown in FIG. 4B. As shown in FIG. 4A, the straight line graph eqS0 passes through the origin and the point (x1, α1) and the straight line graphs eqS1 and eqS2 are parallel to the straight line graph eqS0. As shown in FIG. 4B, the straight line graph eqH0 passes through the origin and the point (x1, α1/2) and the straight line graphs eqH1 and eqH2 are parallel to the straight line graph eqH0.

As shown in FIG. 4A and FIG. 4B, the standard variable moire patterns VS1 and VS2 have a cycle of 2α1 and the high-sensitivity variable moire patterns VH1 and VH2 have a cycle of α1 that is (½) times when compared with that of the standard variable moire patterns VS1 and VS2.

Figure 5:
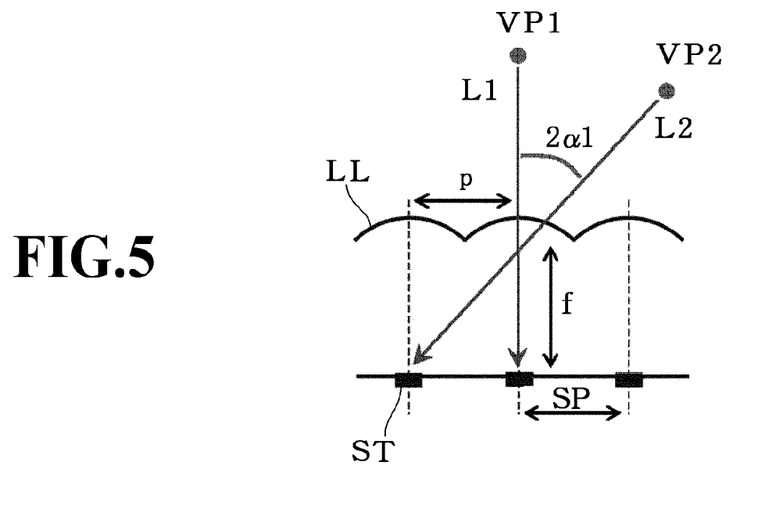
FIG. 5 is a cross-sectional view illustrating the configuration of the high-sensitivity variable moire patterns VH1 and VH2 shown in FIG. 3.

The following section will describe, with reference to FIG. 5, a method by which the high-sensitivity variable moire pattern has a cycle (1/n) times when compared with the cycle of standard variable moire pattern. It is assumed that the standard variable moire pattern and the high-sensitivity variable moire pattern both consist of a lenticular lens LL having a focal distance f provided on a stripe pattern ST. The lenticular lens has a lens pitch p substantially equal to a stripe pattern pitch SP.

In FIG. 5, it is assumed that, when the standard variable moire pattern is observed along the visual line L1 from a visual point VP1, the moving mark is visually recognized at the position of the center lens. Then, the visual point moves (i.e., the visual line is inclined) during which the moving mark is observed as moving. When the visual line is inclined by an angle of 2α1 and reaches the position of the visual point VP2, the adjacent moving mark become visually recognized at the position of the center lens along the visual line L2.

When assuming that the visual line has an inclination (i.e., cycle) of θ, the relation between the cycle θ and the lens pitch p and the focal distance f can be represented as shown in the following formula (1).

Formula 1

$$\theta \approx \tan^{-1}(p/f) \quad (1)$$

Thus, the cycle θ can be changed depending on the ratio (p/f) between the lens pitch and the focal distance. Thus, when the cycle θ needs to be multiplied by (1/n), the ratio between the lens pitch and the focal distance may be set to a value obtained by the following formula (2).

Formula 2

$$\tan\{\tan^{-1}(p/f)/n\} \quad (2)$$

In the above formula, the lens pitch p can be substituted with the distance between centers of the adjacent lenses and the focal distance f can be substituted with the focal distance of the individual lens, respectively, to cope with a case where a standard variable moire pattern or a high-sensitivity variable moire pattern consists of a lens array, not a lenticular lens.

Figure 6:
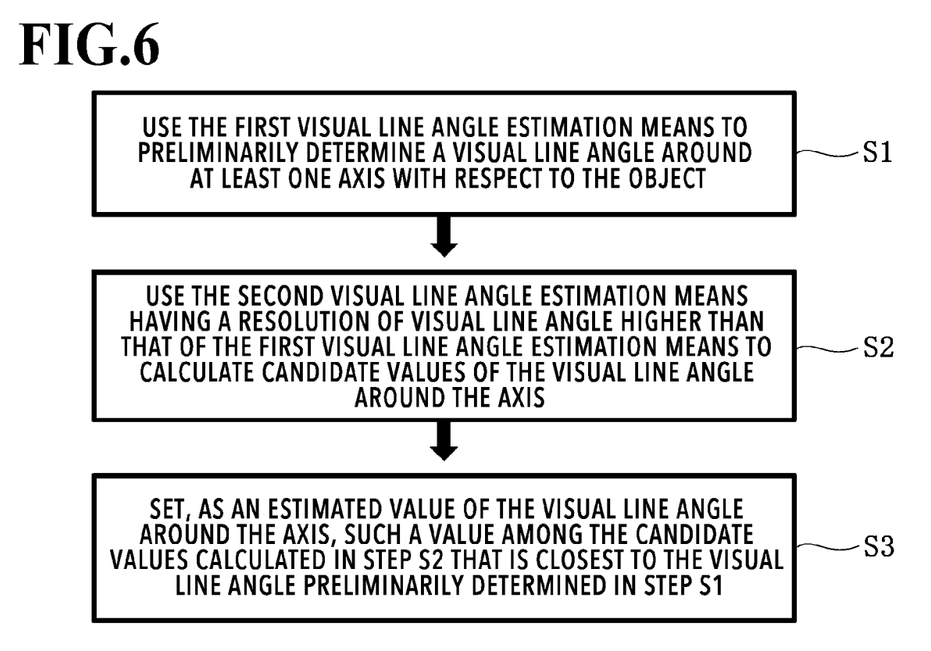
FIG. 6 is a flowchart illustrating a posture estimation method according to an embodiment of the present invention.

The following section will describe, with reference to FIG. 6, the posture estimation method according to an embodiment of the present invention. This posture estimation method will be described by describing a case where the posture estimation is performed using the planar visual marker 1 shown in FIG. 3 as one specific example.

Generally, the posture estimation is also desired to be accurate. However, the high-sensitivity variable moire pattern has a cycle shorter than that of the standard variable moire pattern as described above. Thus, as can be seen from FIG. 4B, a one-to-many relation is established between the moving mark position and the visual line angle in the high-sensitivity variable moire pattern. Thus, it is not possible to uniquely determine the visual line angle depending on the position of the observed moving mark. To solve this, such a method is used that is combined with visual line angle estimation means having different accuracies to firstly use a visual line angle estimation means having a relatively-low accuracy to obtain an approximate visual line angle. Subsequently to use a visual line angle estimation means having a higher accuracy than that of the former one to calculate more accurate visual line angle finally.

In Step S1, the first visual line angle estimation means is used to preliminarily determine a visual line angle around at least one axis with respect to the object. Specifically, a moving mark appearing in the standard variable moire patterns VS1 and VS2 shown in FIG. 3 for example can be observed to thereby use the graph of FIG. 4A to preliminarily determine the visual line angles around the y axis and the x axis of the object to which the planar visual marker 1 is adhered.

Next, in Step S2, the candidate values of the visual line angle around the axis are calculated using the second visual line angle estimation means having a resolution of visual line angle higher than that of the first visual line angle estimation means. Specifically, the moving mark appearing in the high-sensitivity variable moire patterns VH1 and VH2 shown in FIG. 3 for example can be observed to thereby use the graph of FIG. 4B to calculate the candidate values of the visual line angles around the y axis and the x axis.

Then, in Step S3, a value among the candidate values calculated in Step S2 that is closest to the visual line angle preliminarily determined in Step S1 is set as an estimated value of the visual line angle around the axis. In this manner, more accurate visual line angles around the y axis and the x axis can be obtained in the above example.

The following section will describe a method by which the accurate estimation of the posture as described above is followed by the improvement of the estimation accuracy of the object position. This method can be outlined as a method of fixing the visual line angle as a posture parameter obtained by the method as described above to subsequently minimize a reprojection error again.

Generally, the position estimation using the planar visual marker as described above is performed by solving a PnP (Perspective-n-Points) problem to calculate a plurality of correspondences between three-dimensional positions of the points on the marker and observed coordinates on the image thereof. Four points are used to solve this problem. Thus, four surrounding reference points RP1 to RP4 are used in the planar visual marker 1 shown in FIG. 3.

During this, not only the position but also the posture are calculated simultaneously. Specifically, a homogeneous transformation matrix is calculated which representing a translation movement that transforming a camera coordinate system $X_c$, $Y_c$, $Z_c$ shown in FIG. 7 to a marker coordinate system $X_m$, $Y_m$, $Z_m$ and a rotational transfer.

Figure 7:
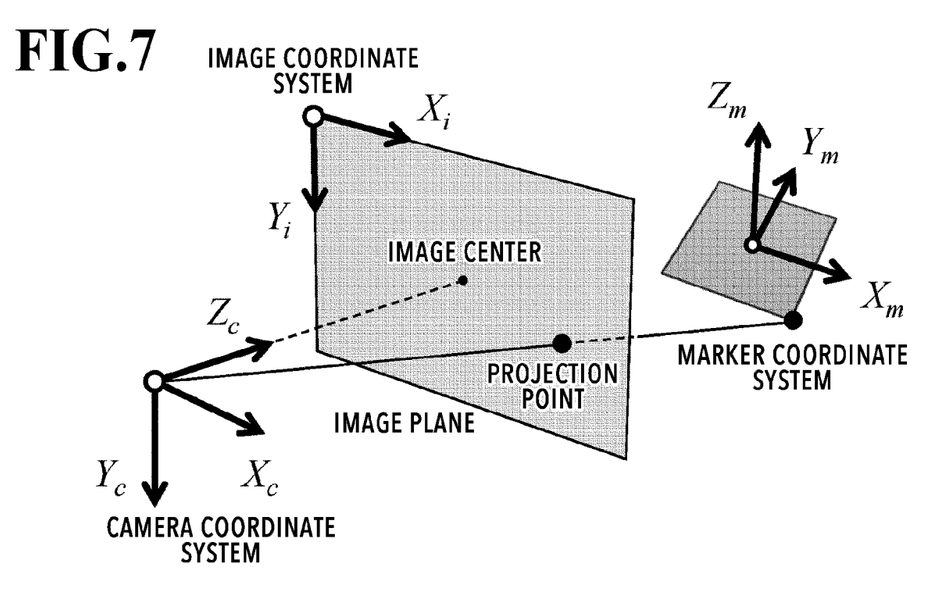
FIG. 7 illustrates a position and posture estimation method according to an embodiment of the present invention.

In order to increase the estimation accuracy, the reprojection error is minimized. The term "reprojection" means to use the estimated position and posture of the marker to calculate where the feature point on the marker is observed on the image coordinate system $X_I$, $Y_I$ (image plane). An error between an actually-observed point on the image and a reprojected point (the distance on the image plane) is called a reprojection error. The minimization of the reprojection error is to minutely correct the position and the posture of the marker based on the originally-calculated position and posture of the marker so as to minimize the reprojection error. This minimization is performed by repeated calculations based on a nonlinear optimization method such as the Newton's method or the Marcato method.

Figure 8:
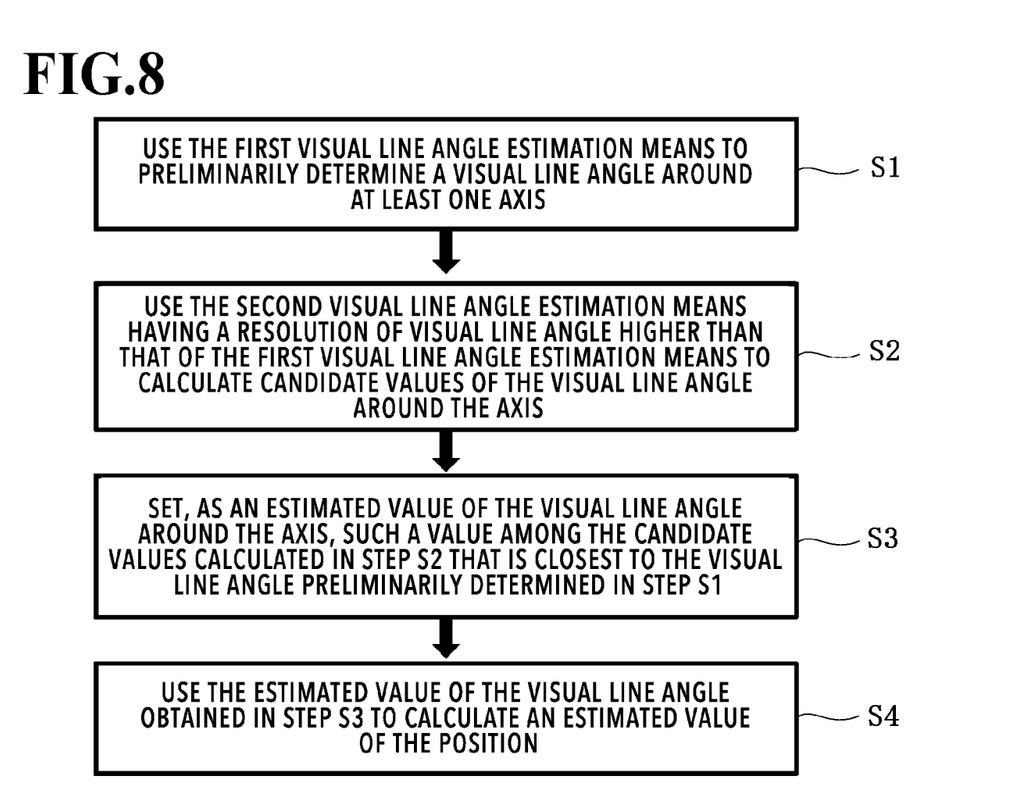
FIG. 8 is a flowchart illustrating the position and posture estimation method according to an embodiment of the present invention.

Based on the above assumption, the following section will describe the position and posture estimation method according to an embodiment of the present invention with reference to FIG. 8. Step S1 to Step S3 shown in FIG. 8 are the same as Step S1 to Step S3 shown in FIG. 6 and thus will not be further described.

In Step S4 shown in FIG. 8, the estimated value of the visual line angle obtained in Step S3 is used to calculate the estimated value of the position. Specifically, the position information can be more accurately corrected by using the posture estimation method according to an embodiment of the present invention shown in FIG. 6 (i.e., by minimizing the reprojection error again only with regard to a position parameter while a posture parameter is fixed).

The minimization is not limited to any particular method and may be performed based on a method among nonlinear optimization methods that is used while fixing the posture parameter or that searches the minimum reprojection error value by a search algorithm while minutely changing the position parameter.

The following section will describe a modification example of the planar visual marker 1 according to an embodiment of the present invention shown in FIG. 3.

Figure 9:
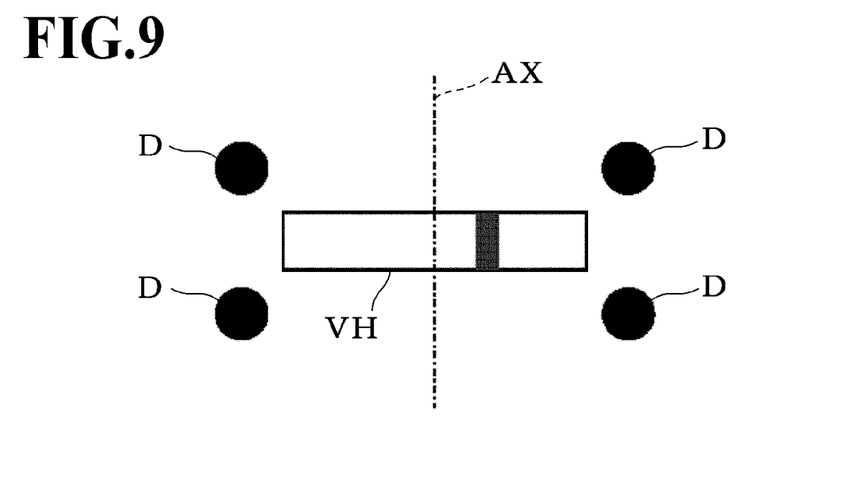
FIG. 9 illustrates the first modification example of the planar visual marker 1 shown in FIG. 3.

As shown in FIG. 9, a visual line angle detection means may be provided not by the standard variable moire pattern but by a dot mark D combined with a high-sensitivity variable moire pattern VH. In FIG. 9, the broken line shows a rotation axis AX.

Figure 10:
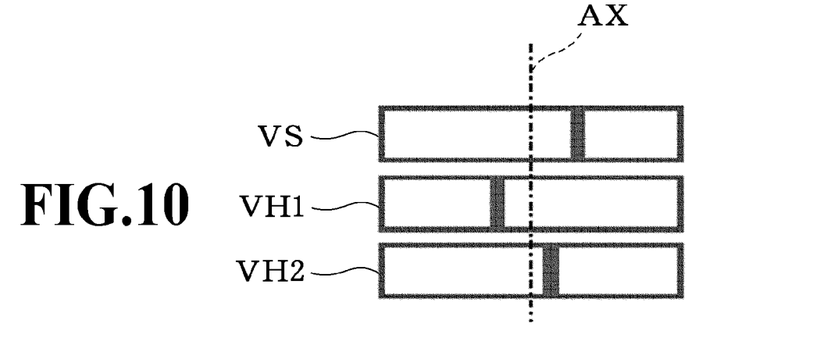
FIG. 10 illustrates the second modification example of the planar visual marker 1 shown in FIG. 3.

As shown in FIG. 10, In addition to the standard variable moire pattern VS and the high-sensitivity variable moire pattern VH1, a high-sensitivity moire pattern VH2 having a further-higher sensitivity than that of the high-sensitivity variable moire pattern VH1 may be used in combination. In the configuration as described above, the posture estimation method shown in FIG. 6 can be applied between the high-sensitivity variable moire pattern VH1 and the high-sensitivity variable moire pattern VH2 to thereby improve the visual line angle estimation accuracy.

Figure 11:
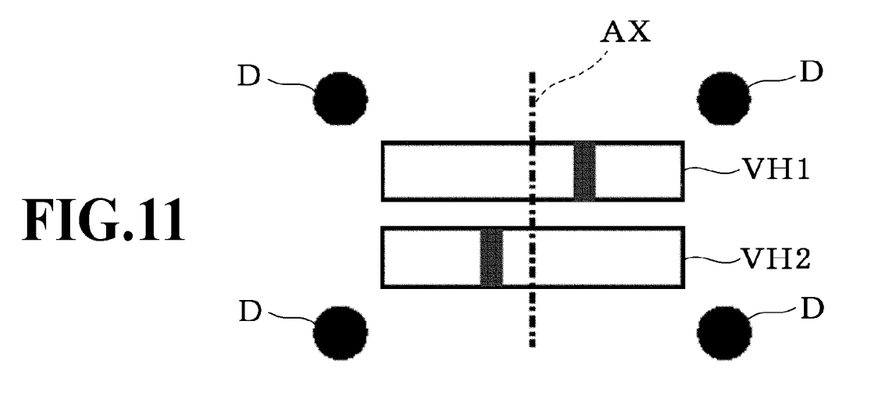
FIG. 11 illustrates the third modification example of the planar visual marker 1 shown in FIG. 3.
Figure 12:
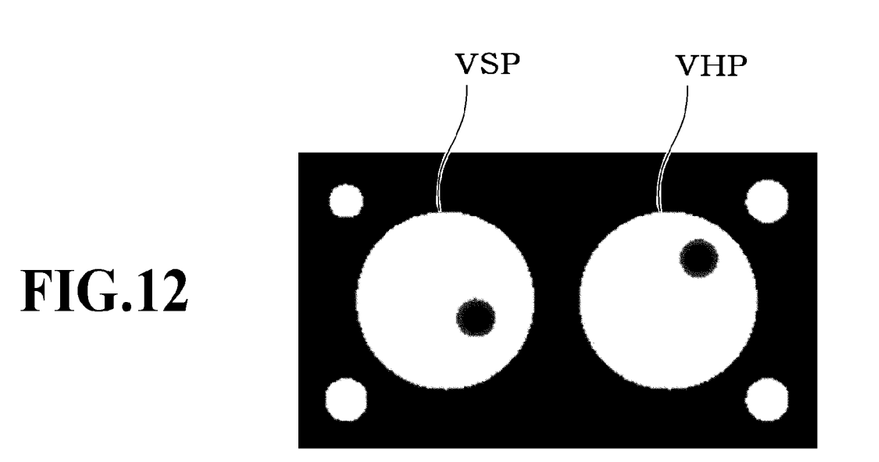
FIG. 12 illustrates the fourth modification example of the planar visual marker 1 shown in FIG. 3.

As shown in FIG. 11, the standard variable moire pattern VS shown in FIG. 10 may be substituted with the dot mark D. As shown in FIG. 12, a lens array-type standard variable moire pattern VSP may be used as a standard variable moire pattern and the lens array-type high-sensitivity variable moire pattern VHP may be used as a high-sensitivity variable moire pattern.

Figure 13:
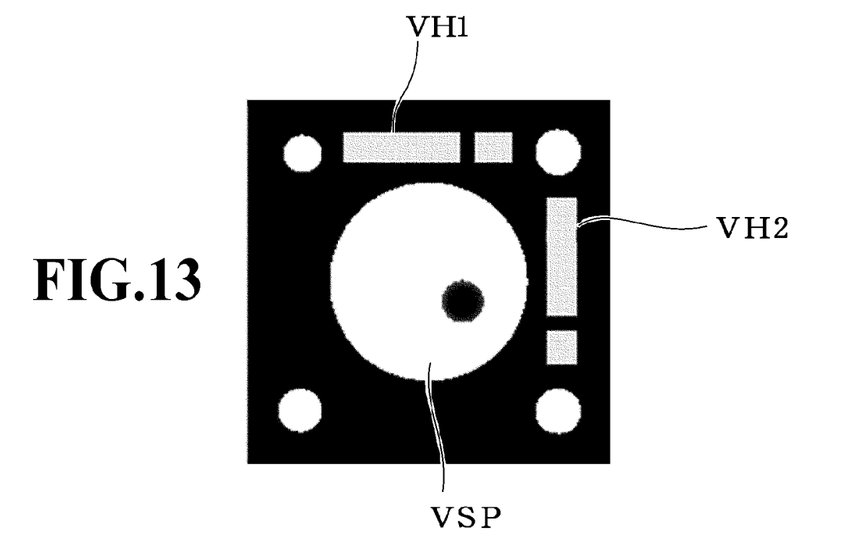
FIG. 13 illustrates the fifth modification example of the planar visual marker 1 shown in FIG. 3.
Figure 14:
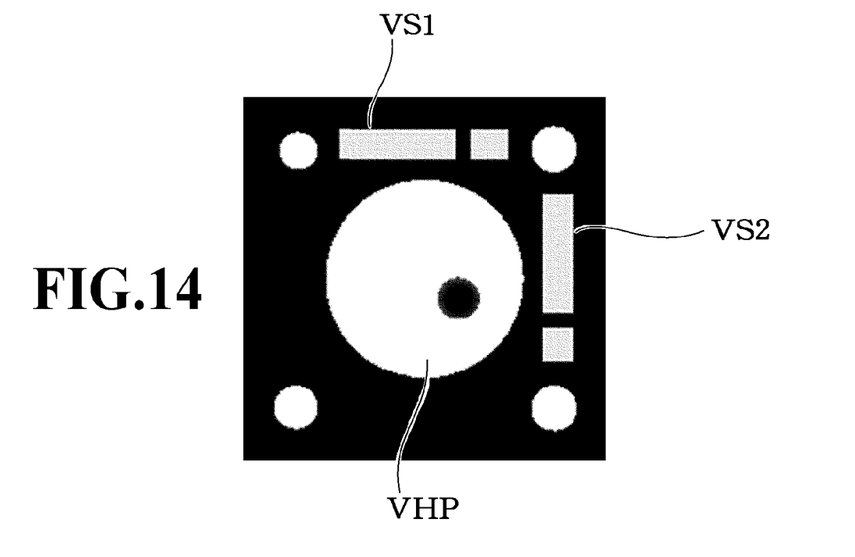
FIG. 14 illustrates the sixth modification example of the planar visual marker 1 shown in FIG. 3.

As shown in FIG. 13, the lens array-type high-sensitivity variable moire pattern VHP shown in FIG. 12 may be substituted with the high-sensitivity variable moire patterns VH1 and VH2. As shown in FIG. 14, the lens array-type standard variable moire pattern VSP shown in FIG. 12 may be substituted with the standard variable moire patterns VS1 and VS2.

Figure 15:
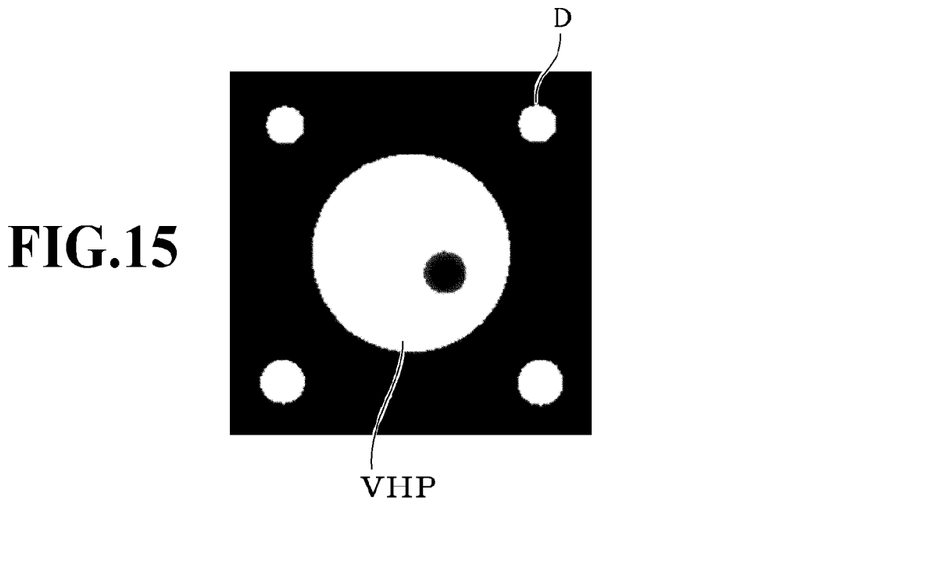
FIG. 15 illustrates the seventh modification example of the planar visual marker 1 shown in FIG. 3.
Figure 16:
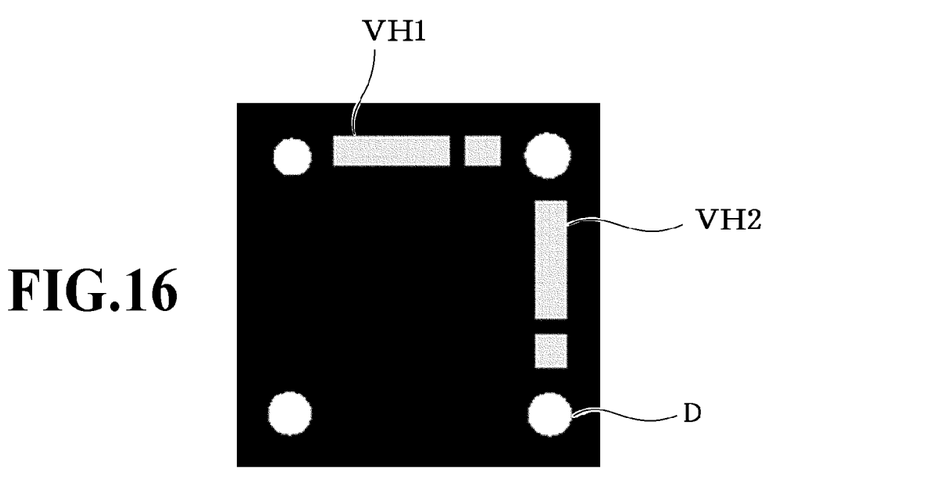
FIG. 16 illustrates the eighth modification example of the planar visual marker 1 shown in FIG. 3.

As shown in FIG. 15, the function of the lens array-type standard variable moire pattern VSP shown in FIG. 12 may be substituted with the dot marks D at four corners. As shown in FIG. 16, the function of the lens array-type standard variable moire pattern VSP shown in FIG. 13 may be substituted with the dot marks D at four corners.

Figure 17:
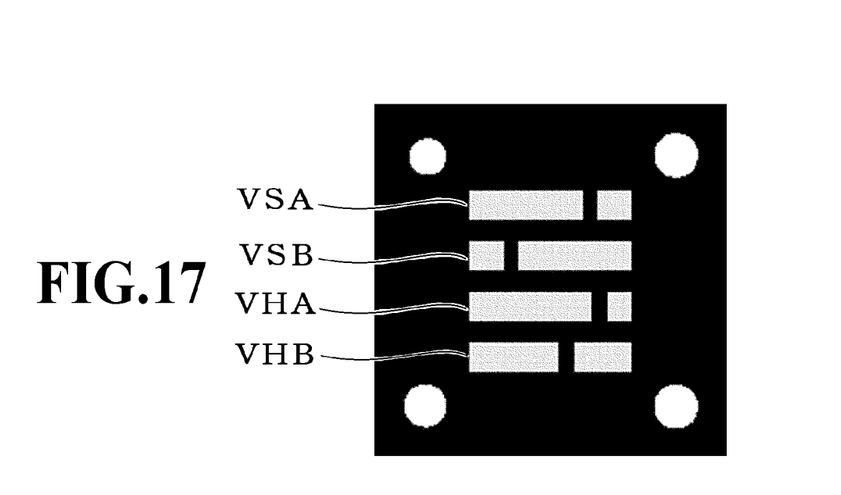
FIG. 17 illustrates the ninth modification example of the planar visual marker 1 shown in FIG. 3.

As shown in FIG. 17, a layout may be used in which the standard variable moire pattern VSA and the high-sensitivity variable moire pattern VHA having a rotation axis orthogonal to the direction along which the moving mark moves as well as the standard variable moire pattern VSB and the high-sensitivity variable moire pattern VHB having a rotation axis parallel to the direction along which the moving mark moves are provided with their major axis directions aligned.

Figure 18:
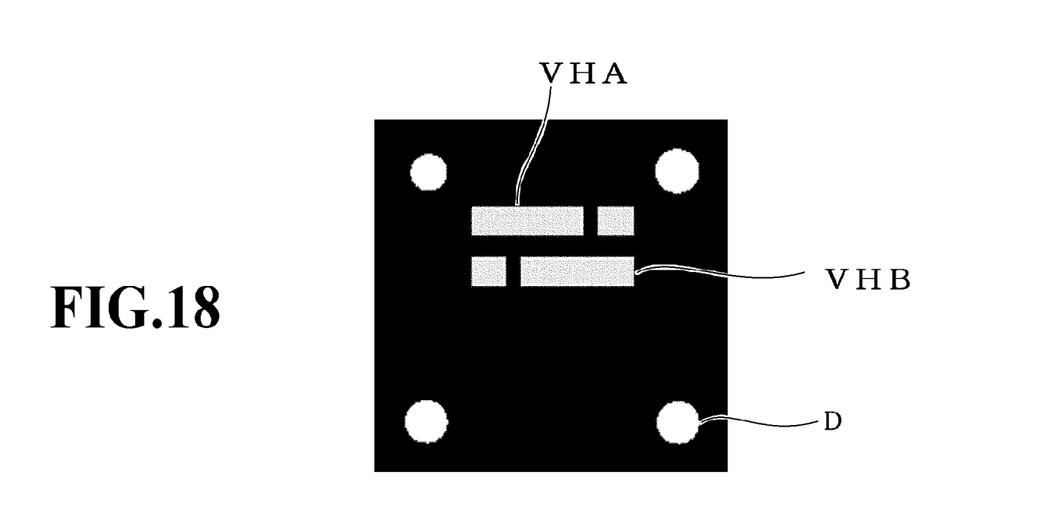
FIG. 18 illustrates the tenth modification example of the planar visual marker 1 shown in FIG. 3.

As shown in FIG. 18, the functions of the standard variable moire pattern VSA and the standard variable moire pattern VSB shown in FIG. 17 may be substituted with the dot marks D at four corners.

By the above description, the planar visual marker 1, the posture estimation method, and the position and posture estimation method according to an embodiment of the present invention can provide the estimation of a position and a posture more accurately than the prior art.

REFERENCE SIGNS LIST

1 Planar visual marker
VS,VS1,VS2,VSA,VSB Standard variable moire pattern
VSP Lens array-type standard variable moire pattern
VH,VH1,VH2,VHA,VHB High-sensitivity variable moire pattern
VHP Lens array-type high-sensitivity variable moire pattern
P Lens pitch
f Focal distance
D Dot mark

The invention claimed is:

1. A marker for estimating the posture of an object, comprising:
   a first visual line angle estimation means for estimating a visual line angle around at least one axis with respect to the object; and
   a second visual line angle estimation means for estimating the visual line angle around the axis, the second visual line angle estimation means having a resolution of the visual line angle higher than that of the first visual line angle estimation means,
   and wherein:
      the first and second visual line angle estimation means consist of a lenticular lens or a lens array provided on a stripe pattern and,
      when assuming that the lenticular lens or the lens array as the first visual line angle estimation means has a lens pitch p and a focal distance f, the lenticular lens or the lens array as the second visual line angle estimation means has a ratio between the lens pitch and the focal distance that is calculated as $\tan(\tan^{-}(p/f)/n)$, where n is a number larger than 1.

2. A posture estimation method using a marker for estimating the posture of an object, comprising:
   a first step of using a first visual line angle estimation means to preliminarily determine a visual line angle around at least one axis with respect to the object;
   a second step of using a second visual line angle estimation means having a resolution of the visual line angle higher than that of the first visual line angle estimation means to calculate candidate values of the visual line angle around the axis; and
   a third step of setting, as an estimated value of the visual line angle around the axis, such a value among the candidate values calculated in the second step that is closest to the visual line angle preliminarily determined in the first step,
   wherein:
      the first and second visual line angle estimation means consist of a lenticular lens or a lens array provided on a stripe pattern and,
      when assuming that the lenticular lens or the lens array as the first visual line angle estimation means has a lens pitch p and a focal distance f, the lenticular lens or the lens array as the second visual line angle estimation means has a ratio between the lens pitch and the focal distance that is calculated as tan(tan−1(p/f)n), where n is a number larger than 1.

3. A position and posture estimation method using a marker by which an optimal solution using both of the position and posture of an object as a variable is obtained to thereby determine an estimated values of the position and the posture, comprising:
- a first step of using a first visual line angle estimation means to preliminarily determine a visual line angle around at least one axis;
- a second step of using a second visual line angle estimation means having a resolution of the visual line angle higher than that of the first visual line angle estimation means to calculate candidate values of the visual line angle around the axis;
- a third step of setting, as an estimated value of the visual line angle around the axis, such a value among the candidate values calculated in the second step that is closest to the visual line angle preliminarily determined in the first step; and
- a fourth step of using the estimated value of the visual line angle obtained in the third step to calculate an estimated value of the position, wherein:
- the first and second visual line angle estimation means consist of a lenticular lens or a lens array provided on a stripe pattern and,
- when assuming that the lenticular lens or the lens array as the first visual line angle estimation means has a lens pitch p and a focal distance f, the lenticular lens or the lens array as the second visual line angle estimation means has a ratio between the lens pitch and the focal distance that is calculated as tan(tan−1(p/f)/n), where n is a number larger than 1.

* * * * *